(12) United States Patent
Zhao et al.

(10) Patent No.: US 7,305,881 B2
(45) Date of Patent: Dec. 11, 2007

(54) METHOD AND CIRCUITRY FOR THERMAL ACCELEROMETER SIGNAL CONDITIONING

(75) Inventors: Yang Zhao, Andover, MA (US); Albert Leung, Burnaby (CA); Michael E. Rebeschini, Hanover Park, IL (US); Gregory P. Pucci, Batavia, IL (US); Alexander Dribinsky, Naperville, IL (US); Yongyao Cai, Acton, MA (US)

(73) Assignee: Memsic, Inc., North Andover, MA (US)

( * ) Notice: Subject to any disclaimer, the term of this patent is extended or adjusted under 35 U.S.C. 154(b) by 322 days.

(21) Appl. No.: 11/146,993

(22) Filed: Jun. 7, 2005

(65) Prior Publication Data

US 2005/0274180 A1 Dec. 15, 2005

Related U.S. Application Data

(60) Provisional application No. 60/578,148, filed on Jun. 9, 2004.

(51) Int. Cl.
*G01P 15/00* (2006.01)
*G01P 15/08* (2006.01)

(52) U.S. Cl. .............................. 73/514.05; 73/514.09; 73/514.33

(58) Field of Classification Search .............................. 73/514.05–514.11, 497, 514.33
See application file for complete search history.

(56) References Cited

U.S. PATENT DOCUMENTS

| 5,719,333 | A | * | 2/1998 | Hosoi et al. | 73/514.05 |
| 5,808,197 | A | * | 9/1998 | Dao | 73/514.09 |
| 6,182,509 | B1 | * | 2/2001 | Leung | 73/514.05 |
| 6,589,433 | B2 | | 7/2003 | Leung | 216/2 |
| 6,795,752 | B1 | * | 9/2004 | Zhao et al. | 700/299 |
| 7,069,785 | B2 | * | 7/2006 | Chou | 73/514.09 |

* cited by examiner

*Primary Examiner*—Helen Kwok
(74) *Attorney, Agent, or Firm*—Weingarten, Schurgin, Gagnebin & Lebovici LLP

(57) ABSTRACT

A thermal accelerometer device that provides a compensation for sensitivity variations over temperature. The thermal accelerometer includes signal conditioning circuitry operative to receive analog signals representing a differential temperature is indicative of a sensed acceleration. The signal conditioning circuitry includes serially connected A-to-D and D-to-A converters, which implement a temperature dependent function and process the received signals to provide a compensation for sensitivity variations over a range of ambient temperature. To provide a ratiometric compensation for variations in power supply voltage, a buffered voltage proportional to the supply voltage is provided as a reference voltage to the D-to-A converter. The thermal accelerometer includes a self-test circuit for verifying the integrity of a heater, temperature sensors, and circuitry included within the device.

8 Claims, 4 Drawing Sheets

US 7,305,881 B2

METHOD AND CIRCUITRY FOR THERMAL ACCELEROMETER SIGNAL CONDITIONING

CROSS REFERENCE TO RELATED APPLICATIONS

This application claims priority of U.S. Provisional Patent Application No. 60/578,148 filed Jun. 9, 2004 entitled METHOD AND CIRCUITRY FOR THERMAL ACCELEROMETER SIGNAL CONDITIONING.

STATEMENT REGARDING FEDERALLY SPONSORED RESEARCH OR DEVELOPMENT

N/A

BACKGROUND OF THE INVENTION

The present invention relates generally to micro-machined thermal accelerometers, and more specifically to an improved technique of compensating for sensitivity variations over temperature in thermal accelerometers.

Thermal accelerometers are known that have the capability of detecting acceleration along multiple axes. For example, U.S. Pat. No. 6,182,509 (the '509 patent) discloses a thermal accelerometer device configured to detect acceleration along 2-axes. As disclosed in the '509 patent, the 2-axes thermal accelerometer comprises a substrate having a cavity etched therein, and a structure including a small heater plate and four temperature sensors suspended over the cavity. The heater plate is positioned at the center of the suspended structure, which is in a plane defined by the X and Y axes. Further, two of the four temperature sensors are placed along the X axis on opposite sides of and at substantially equal distances from the heater plate, while the other two temperature sensors are similarly placed along the Y axis on opposite sides of and at substantially equal distances from the heater plate. In a typical mode of operation, electrical current is passed through the heater plate, which heats the surrounding fluid (e.g., air) within the cavity to generate a symmetrical temperature gradient in the directions of the X and Y axes. Because the respective pairs of temperature sensors disposed along the X and Y axes are equidistant from the heater plate, the differential temperature between each pair of temperature sensors is initially zero. However, if an accelerating force is applied to the device in a direction parallel to the X-Y plane, then the temperature distribution of the fluid shifts. For example, when acceleration is applied in the X direction, a differential temperature can be detected by the temperature sensors disposed along the X axis. Similarly, when acceleration is applied in the Y direction, a differential temperature can be detected by the temperature sensors disposed along the Y axis. A bridge circuit and a differential amplifier are typically employed to generate signals representing the detected differential temperatures, which are proportional to the acceleration applied in the directions of the respective axes. According to the '509 patent, the thermal accelerometer can be fabricated using known CMOS or bipolar processes, thereby providing a highly reliable accelerometer that can be integrated with signal conditioning circuitry at relatively low cost.

One drawback of the above-described thermal accelerometer is that its sensitivity generally depends upon the thermal properties of the fluid within the cavity of the device. Such thermal properties include the fluid density, specific heat, thermal conductivity, and dynamic viscosity. Each of these fluid thermal properties is a function of the temperature of the fluid, which depends upon the level of heat generated by the heater plate and the ambient temperature. Accordingly, to utilize the thermal accelerometer in applications in which the device is subject to significant fluctuations in ambient temperature, e.g., automotive applications, techniques must be employed to compensate for sensitivity variations over a range of temperature.

One technique of compensating for sensitivity variations over temperature in thermal accelerometers includes employing a micro-controller to access compensation values from a lookup table, and to correct the accelerometer output using the compensation values. Such a technique has drawbacks, however, because area limitations and implementation complexities can make integrating a thermal accelerometer with a micro-controller rather difficult. Compensation techniques that employ digital signal processing (DSP) are also problematic due to the difficulties involved in integrating DSP circuitry with a thermal accelerometer. In addition, compensation techniques employing external micro-controllers or DSP devices can be problematic due to accompanying increases in material and manufacturing costs.

Another drawback of conventional thermal accelerometers such as the thermal accelerometer described above is that they typically fail to provide a ratiometric compensation for variations in power supply voltage. As a result, an absolute reference voltage is generally required to implement read-out circuitry for these devices, resulting in increased implementation complexity and cost. In addition, conventional thermal accelerometers typically fail to provide self-test procedures, which are often required in applications demanding high levels of reliability, e.g., automotive and medical applications.

It would therefore be desirable to have a thermal accelerometer that provides a compensation for sensitivity variations over a range of temperature. Such a thermal accelerometer would also provide a ratiometric compensation for variations in power supply voltage and a self-test procedure, while avoiding the drawbacks of the above-described conventional thermal accelerometers.

BRIEF SUMMARY OF THE INVENTION

In accordance with the present invention, a thermal accelerometer device is disclosed that provides a compensation for sensitivity variations over temperature. The presently disclosed thermal accelerometer comprises a 2-dimensional structure disposed in a plane defined by the X and Y axes. The thermal accelerometer employs differential temperatures detected by temperature sensing elements disposed along the X and/or Y axes on opposite sides of and at substantially equal distances from a heater element to provide indications of acceleration in the X and/or Y directions. The thermal accelerometer includes signal conditioning circuitry configured to compensate for variations in the sensitivity of the device over a range of temperature.

In one embodiment, the thermal accelerometer comprises a thermal acceleration sensor including a substrate having a substantially planar surface defined by the X and Y axes, at least one cavity formed in the substrate, a fluid such as air disposed within the cavity, at least one heater element, and first and second fluid temperature sensing elements. The heater element is suspended over the cavity in the X-Y plane, and the first and second fluid temperature sensing elements are disposed along the X axis or the Y axis on opposite sides of and at substantially equal distances from the heater element. The thermal accelerometer further includes signal conditioning circuitry operative to receive analog signals representing a differential temperature detected by the first and second fluid temperature sensing elements, in which the differential temperature is indicative of a sensed acceleration in the X or Y direction. The signal conditioning circuitry is further operative to implement a temperature dependent function, and to process the received signals using the temperature dependent function to provide a compensation for sensitivity variations over a predetermined temperature range. In the preferred embodiment, the temperature dependent function is a bilinear function.

In the presently disclosed embodiment, the signal conditioning circuitry includes at least one ambient temperature sensing element, at least one analog-to-digital (A-to-D) converter, and at least one digital-to-analog (D-to-A) converter. The ambient temperature sensing element provides a reference voltage level proportional to the ambient temperature to the A-to-D and the D-to-A converters. The A-to-D converter receives an analog input signal representing the sensed acceleration in the X or Y direction, and provides a corresponding digital output signal to the D-to-A converter serially connected thereto. The digital output signal generated by the A-to-D converter is inversely proportional to the reference voltage level provided by the ambient temperature sensor. The D-to-A converter receives the digital signal, and generates a corresponding analog output signal, which is directly proportional to the reference voltage level of the ambient temperature sensor. In effect, the serially connected A-to-D and D-to-A converters implement a temperature dependent bilinear function, which is used to process the analog signal representing the sensed acceleration. In this way, the signal conditioning circuitry can provide a compensation for sensitivity variations over the predetermined temperature range.

To provide a ratiometric compensation for variations in power supply voltage, a buffered voltage proportional to the power supply voltage is provided as a reference voltage level to the D-to-A converter included in the signal conditioning circuitry. Because the analog output signal generated by the D-to-A converter is proportional to the reference voltage level, the resulting analog output is a ratiometric signal that scales with the power supply voltage.

In another embodiment, a self-test circuit is integrated with the thermal accelerometer. In this embodiment, the heater element suspended over the cavity of the thermal accelerometer is implemented by a plurality of heater elements. The self-test circuit includes at least one auxiliary resistive element connected in series with at least one of the plurality of heater elements for reducing the heater power on one side of the cavity. The self-test circuit further includes a switch for switchably connecting the auxiliary resistive element to the respective heater element suspended over the cavity. The duty cycle of the switch is adjustable to achieve a desired level of thermal asymmetry within the cavity, thereby simulating an applied acceleration. In this way, the self-test circuit can verify the integrity of the heater element(s) suspended over the cavity, the fluid temperature sensing elements, and the circuitry providing the output signals representative of the sensed acceleration.

Other features, functions, and aspects of the invention will be evident from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the drawings of which.

DETAILED DESCRIPTION OF THE INVENTION

The disclosure of U.S. Provisional Patent Application No. 60/578,148 filed Jun. 9, 2004 entitled METHOD AND CIRCUITRY FOR THERMAL ACCELEROMETER SIGNAL CONDITIONING, and the disclosure of U.S. Provisional Patent Application No. 60/578,273 filed Jun. 9, 2004 entitled Z-AXIS THERMAL ACCELEROMETER, are incorporated herein by reference.

A thermal accelerometer device is disclosed that provides a compensation for sensitivity variations over temperature. The thermal accelerometer includes signal conditioning circuitry operative to receive an analog signal representing a differential temperature indicative of an applied acceleration. In the preferred embodiment, the signal conditioning circuitry includes serially connected A-to-D and D-to-A converters, which implement a temperature dependent function and process the received signals to provide a compensation for sensitivity variations over a range of temperature. The thermal accelerometer further provides a ratiometric compensation for variations in power supply voltage. The thermal accelerometer includes a self-test circuit for verifying the integrity of a heater element, temperature sensors, and the signal conditioning circuitry included within the device.

Figure 1:
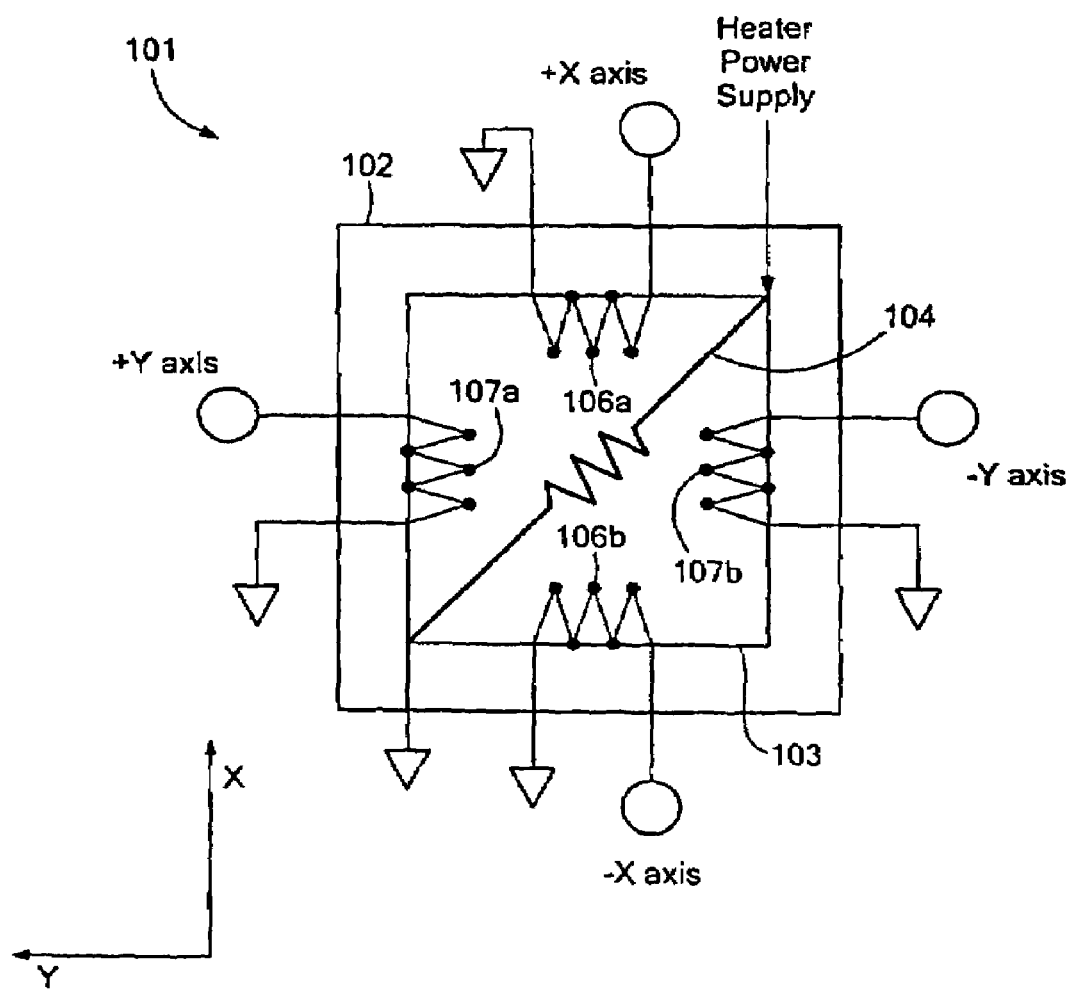
FIG. 1 is a plan view of a 2-axes micro-machined thermal acceleration sensor including a heater element and two pairs of thermocouples according to the present invention.

FIG. 1 depicts an illustrative embodiment of a thermal acceleration sensor 101, in accordance with the present invention. In the illustrated embodiment, the thermal acceleration sensor 101 includes a substantially planar substrate 102, a cavity 103 formed in the substrate 102, a heater element 104 suspended over the cavity 103, a first pair of temperature sensing elements 106a-106b disposed along the X axis, and a second pair of temperature sensing elements 107a-107b disposed along the Y axis. The thermal acceleration sensor 101 further includes a fluid disposed in the cavity 103 to allow convective heat transfer to occur in the vicinity of the cavity 103. The heater element 104 is operative to produce a temperature gradient within the fluid that is symmetrical in both the X and Y directions when the device is at rest.

Because the temperature sensing elements 106a-106b, 107a-107b are disposed at substantially equal distances from the heater element 104, the symmetrical temperature gradients along the X and Y axes cause the differential temperature between the temperature sensing elements 106a-106b, 107a-107b to be zero when the thermal acceleration sensor 101 is at rest. In the event an accelerating force is applied to the sensor 101 in the X direction, the temperature distribution shifts, thereby allowing a non-zero differential temperature proportional to the magnitude of the applied acceleration to be detected by the temperature sensing elements 106a-106b. Similarly, in the event an accelerating force is applied to the sensor 101 in the Y direction, the temperature distribution shifts to allow a non-zero differential temperature proportional to the magnitude of the applied acceleration to be detected by the temperature sensing elements 107a-107b.

In one embodiment, the substrate 102 is made of silicon. Further, each temperature sensing element 106a-106b, 107a-107b is implemented as a thermocouple, the heater element 104 is implemented as one or more heater resistors, and the fluid providing convective heat transfer within the cavity 103 comprises a quantity of air. Those of ordinary skill in this art will appreciate that the thermocouples 106a-106b, 107a-107b and the heater resistor 104 can be fabricated as part of a 2-dimensional structure using known CMOS or bipolar processes. Moreover, the cavity 103 can be formed by etching or by micro-machining the surface of the substrate 102 using any suitable etching or micro-machining technique. In addition, the heater element 104 and the thermocouples 106a-106b, 107a-107b are disposed on suspended bridges (not shown), which can be formed by any suitable etching or micro-machining technique. In this way, the thermal acceleration sensor 101 can be manufactured as a MEMS (micro-electro-mechanical system) structure.

Those of ordinary skill in this art will also appreciate that the sensitivity of a thermal acceleration sensor is dependent upon the thermal properties of the fluid within the cavity of the device. Such thermal properties include the fluid density, specific heat, thermal conductivity, and dynamic viscosity. Each of these fluid thermal properties is a function of the temperature of the fluid, which depends upon the level of heat generated by the heater element and the ambient temperature. The sensitivity variation over temperature "S(T)" for a thermal acceleration sensor may be expressed as $$S_0 \cdot T_0^m = S(T) \cdot T^m, \quad (1)$$

in which "T" is the absolute temperature (° K), "$S_0$" is a constant, "$T_0$" is a reference temperature value (° K), and "m" is an exponent value. Equation (1) can be rewritten as $$S(T) = S_0 \cdot \left(\frac{T}{T_0}\right)^{-m}. \quad (2)$$

As indicated in equations (1) and (2) above, the sensitivity variation S(T) of the thermal acceleration sensor is a function of the absolute temperature T.

To make the output of a thermal acceleration sensor independent of temperature, the thermal acceleration sensor can be provided with signal conditioning circuitry that is temperature dependent. For example, such signal conditioning circuitry can have a temperature dependent gain "G(T)", which may be expressed as $$G(T) = G_0 \cdot \left(\frac{T}{T_0}\right)^m, \quad (3)$$

in which "T" is the absolute temperature (° K), "$T_0$" is the reference temperature value (° K), "m" is the exponent value, and "$G_0$" is a constant independent of temperature.

As described above, the fluid providing convective heat transfer within the thermal acceleration sensor 101 (see FIG. 1) comprises a quantity of air, in which a primary component is nitrogen. According to ideal gas theory, the sensitivity variation S(T) over temperature for nitrogen may be expressed as $$S(T) = S_0 \cdot \left(\frac{T}{T_0}\right)^{-2.67}, \quad (4)$$

in which "−2.67" is substituted for the exponent value m. Accordingly, for nitrogen, there can be about a 4.2:1 variation in sensitivity over a specified range of temperature.

To compensate for such sensitivity variation, the same value of −2.67 can be substituted for the exponent value m in the temperature dependent gain function G(T) (see equation (3)). However, conventional linear analog compensation circuitry is generally incapable of implementing such a high order function. Moreover, area limitations generally preclude implementing such a high order function using integrated digital signal processing (DSP) techniques.

Figure 2:
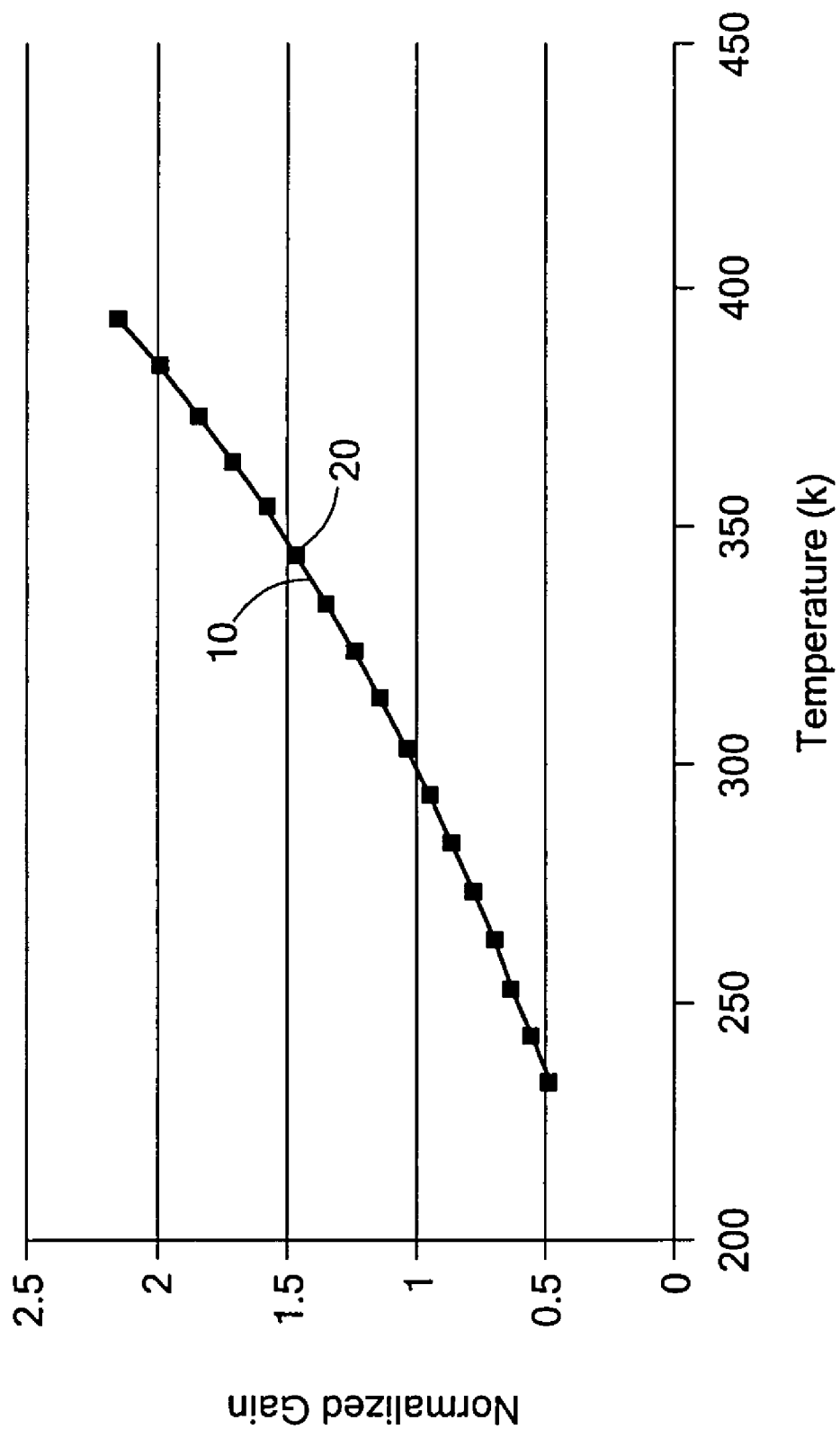
FIG. 2 is a diagram illustrating an ideal gas law function and a bilinear function approximating the ideal gas law function, the bilinear function being used by the thermal acceleration sensor of FIG. 1 to compensate for sensitivity variations over temperature.

In the preferred embodiment, the temperature dependent gain G(T) (see equation (3)) is approximated using a bilinear function "$F_a(T)$" expressed as $$F_a(T) = \frac{S_n \cdot T + I_n}{S_d \cdot T + I_d}, \quad (5)$$

in which "T" is the absolute temperature (° K), and "$S_n$" and "$S_d$" are the slopes and "$I_n$" and "$I_d$" are the intercepts of the linear functions in the numerator and denominator, respectively, of the bilinear function $F_a(T)$. FIG. 2 depicts a representation 10 (solid curve) of the temperature dependent gain function G(T) and a representation 20 (dotted curve) of the bilinear function $F_a(T)$. As shown in FIG. 2, the bilinear function 20 is a good approximation of the temperature dependent gain function 10.

Figure 3:
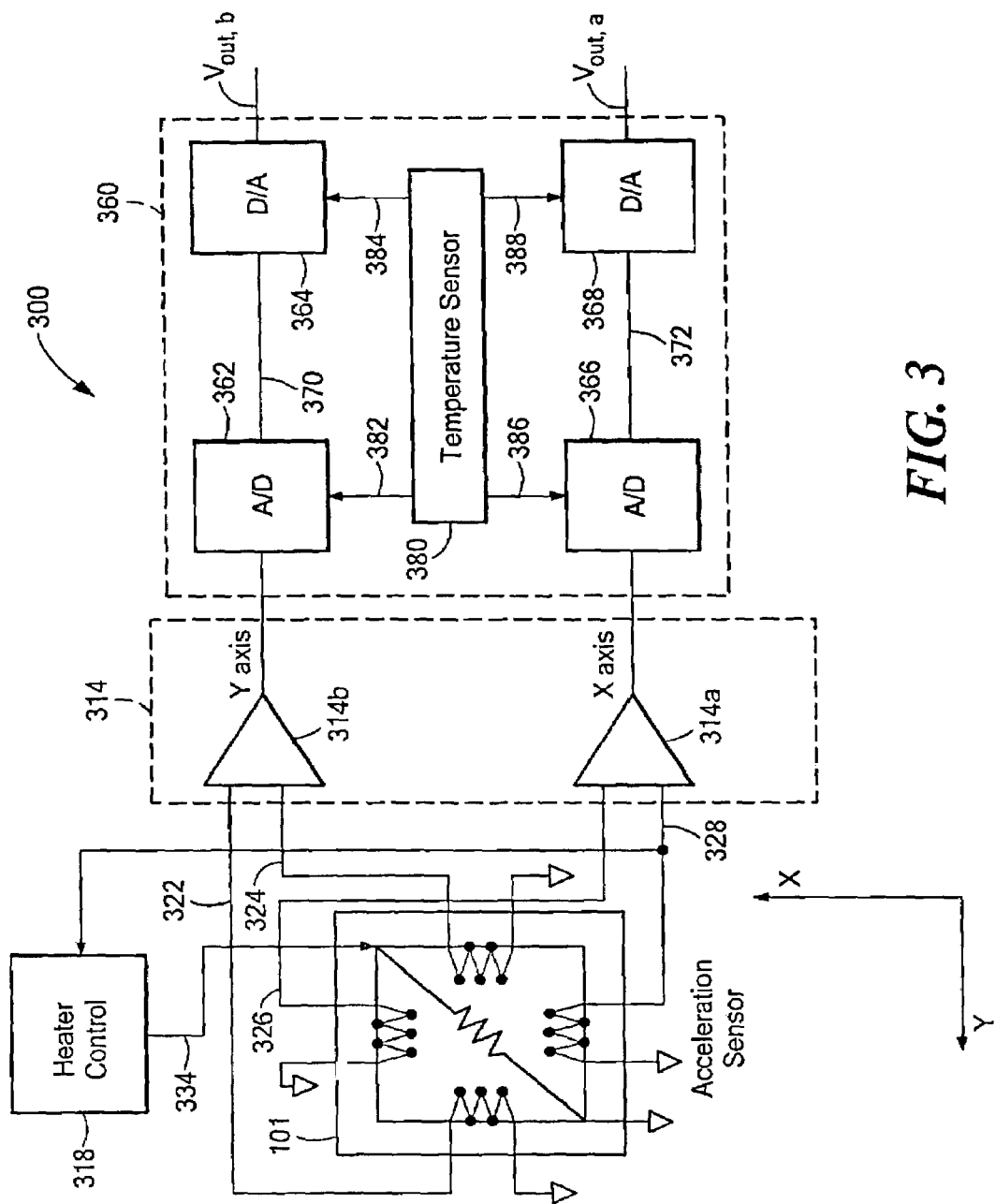
FIG. 3 is a schematic diagram of a 2-axes thermal accelerometer according to the present invention, including the thermal acceleration sensor of FIG. 1 and signal conditioning circuitry for providing a compensation for sensitivity variations over a range of temperature.

FIG. 3 depicts an illustrative embodiment of a thermal accelerometer 300, in accordance with the present invention. In the illustrated embodiment, the thermal accelerometer 300 includes the thermal acceleration sensor 101 (see also FIG. 1), heater control circuitry 318, amplification circuitry 314, and signal conditioning circuitry 360 for providing output voltages $V_{out,a}$, $V_{out,b}$ representing magnitudes of acceleration in the directions of the X and Y axes, respectively. In the preferred embodiment, the heater control circuitry 318, the amplification circuitry 314, and the signal conditioning circuitry 360 are integrated on-chip with the thermal acceleration sensor 101.

As shown in FIG. 3, the amplification circuitry 314 includes instrumentation amplifiers 314a-314b. The thermal acceleration sensor 101 is operative to provide differential temperature signals indicative of applied acceleration in the X and Y directions to the instrumentation amplifiers 314a-314b via lines 326, 328 and lines 322, 324, respectively. The heater control circuitry 318 receives temperature information from the signal on the line 328, and supplies power to the heater resistor included in the sensor 101 based on that temperature information via a line 334. The signal conditioning circuitry 360 receives amplified versions of the differential temperature signals corresponding to the X and Y axes from the instrumentation amplifiers 314a-314b, respectively.

As described above, the signal conditioning circuitry 360 included in the thermal accelerometer 300 can have a temperature dependent gain G(T) (see equation (5)) to make the output of the thermal acceleration sensor 101 independent of temperature. Further, in the preferred embodiment, the signal conditioning circuitry 360 implements the temperature dependent gain function G(T) as a bilinear function $F_a(T)$ (see equation (5)). To that end, the signal conditioning circuitry 360 includes an ambient temperature sensor 380, analog-to-digital (A-to-D) converters 362, 366, and digital-to-analog (D-to-A) converters 364, 368. The ambient temperature sensor 380 provides reference voltage levels proportional to the ambient temperature to the A-to-D converters 362, 366 via lines 382, 386, respectively, and to the D-to-A converters 364, 368 via lines 384, 388, respectively. The A-to-D converters 366, 362 convert the analog signals provided by the instrumentation amplifiers 314a-314b, respectively, to digital form based on the reference voltage levels on the lines 386, 382. Similarly, the D-to-A converters 368, 364 convert the digital signals provided by the A-to-D converters 366, 362, respectively, to analog form based on the reference voltage levels on the lines 388, 384.

In the presently disclosed embodiment, the digital signals generated by the A-to-D converters 362, 366 are inversely proportional to the reference voltage levels provided by the ambient temperature sensor 380. Further, the analog signals generated by the D-to-A converters 364, 368 are directly proportional to the reference voltage levels provided by the ambient temperature sensor 380. In effect, the serially connected A-to-D and D-to-A converters 362, 364, and the serially connected A-to-D and D-to-A converters 366, 368, implement the temperature dependent bilinear function $F_a(T)$ (see equation (5)), which is used to process the signals representing the sensed acceleration in the X and Y directions. Specifically, the A-to-D converters 362, 366 effectively implement the numerator of the bilinear function $F_a(T)$, and the D-to-A converters 364, 368 effectively implement the denominator of the bilinear function $F_a(T)$. In this way, the signal conditioning circuitry 360 can provide a compensation for sensitivity variations of the thermal acceleration sensor 101 over a predetermined range of temperature.

For example, the A-to-D converters 362, 366 and the D-to-A converters 364, 368 may comprise 1-bit second order over-sampling sigma-delta type converters, or any other suitable type of converters. It is noted that sigma-delta type converters typically have excellent linearity, which is an important feature in sensor signal processing. Further, second order sigma-delta converters generally provide good noise performance in a relatively simple implementation. Higher order sigma-delta converters may alternatively be employed if the application demands lower noise levels.

Figure 4:
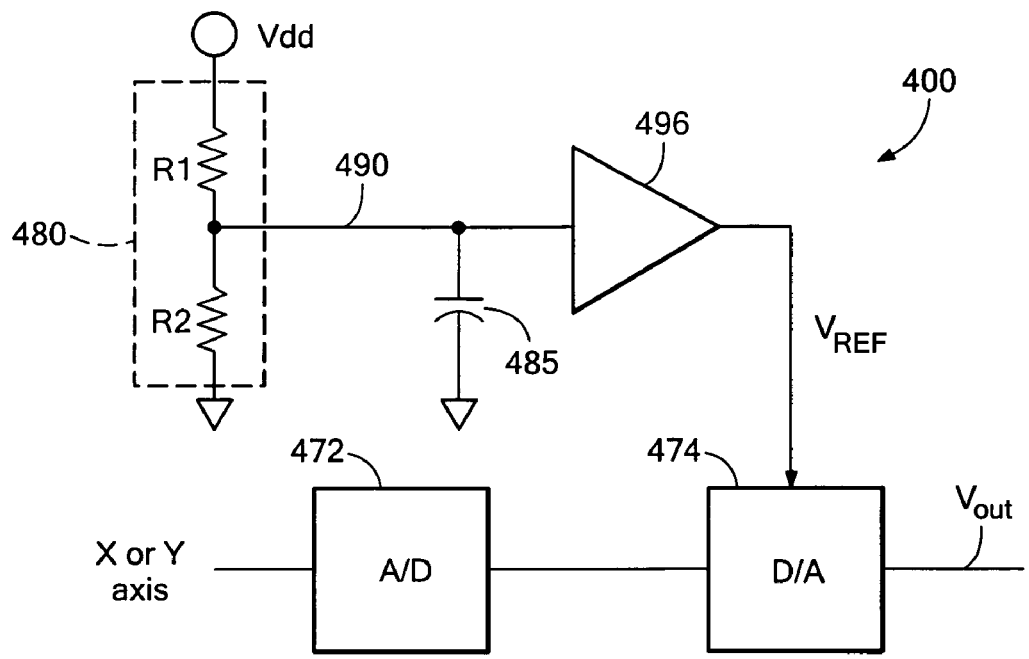
FIG. 4 is a schematic diagram of circuitry for providing a ratiometric compensation for power supply voltage, for use in conjunction with the thermal accelerometer of FIG. 3.

FIG. 4 depicts circuitry 400 operative to generate a ratiometric reference voltage $V_{REF}$. In the presently disclosed embodiment, the reference voltage circuitry 400 is integrated with the thermal accelerometer 300 (see FIG. 3) to provide a ratiometric compensation for variations in the power supply voltage Vdd. The ratiometric reference voltage circuitry 400 comprises a voltage divider 480 including resistors R1-R2, a capacitor 485, and a buffer amplifier 496. As shown in FIG. 4, the buffer amplifier 496 provides the reference voltage $V_{REF}$ to a D-to-A converter 474. It should be understood that the D-to-A converter 474 may correspond to either of the D-to-A converters 364, 368 included in the signal conditioning circuitry 360 (see FIG. 3). Similarly, an A-to-D converter 472 depicted in FIG. 4 may correspond to either of the A-to-D converters 362, 366 included in the signal conditioning circuitry 360 (see FIG. 3).

The resistive voltage divider 480, which is connected between the supply voltage Vdd and ground, provides a voltage level proportional to Vdd to the buffer amplifier 496 via a line 490. The capacitor 485 is connected between the line 90 and ground to form a low pass filter. The buffer amplifier 496 provides the buffered reference voltage $V_{REF}$ to the D-to-A converter 474. It is understood that a suitable reference voltage level (not shown) is also provided to the A-to-D converter 472.

The A-to-D converter 472 receives an analog signal representing a sensed acceleration in the direction of the X or Y axis, converts the analog signal to digital form, and provides the resulting digital signal to the D-to-A converter 474. The D-to-A converter 474 receives the digital signal, converts the digital signal back to analog form, and provides an output voltage $V_{out}$ representing the magnitude of acceleration in the X or Y direction. The output voltage $V_{out}$ generated by the D-to-A converter 474 is directly proportional to the reference voltage level $V_{REF}$ provided by the buffer amplifier 496. Because the reference voltage level $V_{REF}$ is proportional to the power supply voltage Vdd, the output voltage $V_{out}$ is a ratiometric signal that scales with the supply voltage Vdd.

Figure 5:
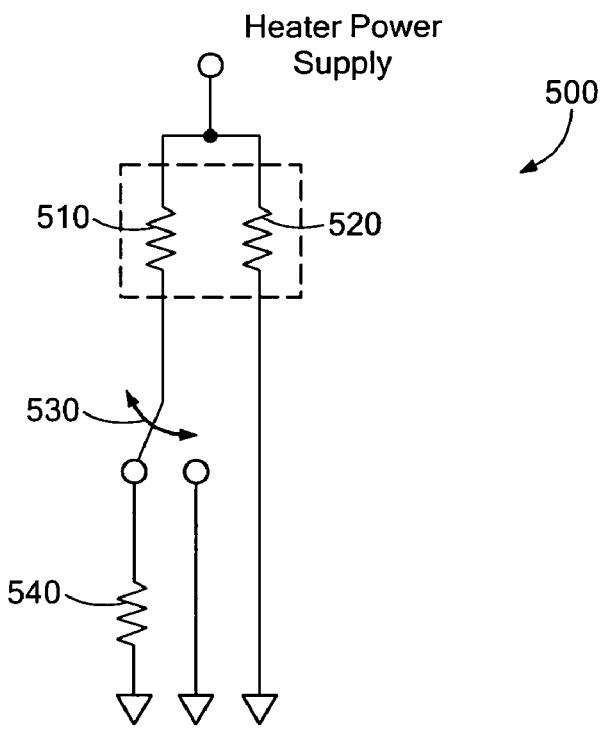
FIG. 5 is a schematic diagram of a self-test circuit, for use in conjunction with the thermal accelerometer of FIG. 3.

FIG. 5 depicts circuitry 500 operative to implement a self-test circuit for the thermal accelerometer 300 (see FIG. 3). In the preferred embodiment, the self-test circuit 500 is integrated with the thermal accelerometer 300 to provide a means for verifying the integrity of the heater element and the thermocouples included in the thermal acceleration sensor 101, and the amplification and signal conditioning circuitry 314, 360 (see FIG. 3). In the presently disclosed embodiment, the heater element can comprise a plurality of heater resistors such as the heater resistors 510, 520 (see FIG. 5), both of which are suspended over the cavity 103 (see FIG. 1). It is understood that the thermocouples 106a-106b, 107a-107b (see FIG. 1) are disposed along respective axes at substantially equal distances from the plurality of heater resistors 510, 520.

As shown in FIG. 5, the self-test circuit 500 includes a switch 530 and an auxiliary resistor 540. The switch 530 is coupled between a selected one of the heater resistors 510, 520, e.g., the heater resistor 510, for switchably connecting the auxiliary resistor 540 in series with the respective heater resistor. When the auxiliary resistor 540 is serially connected to the heater element 510, the heater power on the corresponding side of the cavity is reduced, thereby simulating an applied acceleration. In the preferred embodiment, the duty cycle of the switch 530 is adjustable to achieve a desired level of thermal asymmetry within the cavity. The duty cycle of the switch 530 is directly related to the level of thermal asymmetry. It is noted that the switch 530 can be duty cycled faster than the thermal time constant of the heater resistors 510, 520. By monitoring the output voltages $V_{out,a}$, $V_{out,b}$ representing the magnitude of the simulated acceleration, the integrity of the heater resistors 510, 520, the thermocouples 106a-106b, 107a-107b (see FIG. 1), and the amplification and signal conditioning circuitry 314, 360 can be verified. It is further noted that the mechanism of the self-test circuit 500 can also be used to trim intrinsic sensor offset due to the MEMS structure make tolerance.

It will be appreciated by those of ordinary skill in the art that further modifications to and variations of the above-described method and circuitry for thermal accelerometer signal conditioning may be made without departing from the inventive concepts disclosed herein. Accordingly, the invention should not be viewed as limited except as by the scope and spirit of the appended claims.

What is claimed is:

1. A thermal accelerometer, comprising:
a thermal acceleration sensor including a substrate, at least one cavity formed in the substrate, a fluid disposed in the cavity, at least one heater element suspended over the cavity, a plurality of temperature sensing elements disposed substantially in a plane of the substrate and at substantially equal distances from the heater element, wherein the plurality of temperature sensing elements is operative to detect a temperature of the fluid generated in response to an applied acceleration, and to provide a signal representing the detected fluid temperature; and
signal conditioning circuitry operative to receive the signal representing the detected fluid temperature, to implement a temperature dependent function, and to process the received signal using the temperature dependent function for generating an output signal indicative of the applied acceleration, whereby the signal conditioning circuitry provides a compensation for sensitivity variations of the sensor over a predetermined range of temperature, the signal conditioning circuitry including:
a first reference voltage generator including at least one sensor operative to detect an ambient temperature, the first reference voltage generator being operative to provide a first reference voltage level proportional to the ambient temperature;
at least one analog-to-digital (A-to-D) converter operative to receive the signal representing the detected fluid temperature, to convert the received signal to digital form, and to provide a digital signal inversely proportional to the first reference voltage level; and
at least one digital-to-analog (D-to-A) converter operative to receive the digital signal provided by the A-to-D converter, to convert the digital signal to analog form, and to provide an analog signal directly proportional to the first reference voltage level, the analog signal corresponding to the output signal indicative of the applied acceleration.

2. The thermal accelerometer of claim 1 wherein the temperature dependent function is a bilinear function.

3. The thermal accelerometer of claim 1 wherein the temperature dependent function is a bilinear function $F_a(t)$ of the form $$F_a(T) = \frac{S_n \cdot T + I_n}{S_d \cdot T + I_d},$$

wherein "T" is an absolute temperature (° K), and "$S_n$" is a slope and "$I_n$" is an intercept of a first linear function in a numerator of the bilinear function, and "$S_d$" is a slope and "$I_d$" is an intercept of a second linear function in a denominator of the bilinear function,
wherein the A-to-D converter is operative to implement the first linear function, and
wherein the D-to-A converter is operative to implement the second linear function.

4. The thermal accelerometer of claim 1 further including a second reference voltage generator operative to provide a second reference voltage level proportional to a power supply voltage, and wherein the D-to-A converter is further operative to receive the digital signal provided by the A-to-D converter, to convert the digital signal to analog form, and to provide an analog signal directly proportional to the second reference voltage level, the analog signal corresponding to the output signal indicative of the applied acceleration, whereby the D-to-A converter provides a ratiometric compensation for variations in the power supply voltage.

5. A thermal accelerometer, comprising:
a thermal acceleration sensor including a substrate, at least one cavity formed in the substrate, a fluid disposed in the cavity, a plurality of heater elements suspended over the cavity, a plurality of temperature sensing elements disposed substantially in a plane of the substrate and at substantially equal distances from the plurality of heater elements, wherein the plurality of temperature sensing elements is operative to detect a first temperature of the fluid generated in response to an applied acceleration, and to provide a first signal indicative of the applied acceleration; and
a test circuit including at least one switch and at least one resistive element, the switch being disposed between a respective one of the plurality of heater elements and the resistive element, the switch being operative to switchably connect the respective heater element to the resistive element to generate a desired level of thermal asymmetry within the cavity, thereby simulating an applied acceleration,
wherein the plurality of temperature sensing elements is further operative to detect a second temperature of the fluid generated in response to the simulated acceleration, and to provide a second signal indicative of the simulated acceleration.

6. The thermal accelerometer of claim 5 wherein the switch has a duty cycle that is controllable for generating the desired level of thermal asymmetry within the cavity.

7. A thermal accelerometer, comprising:
a thermal acceleration sensor including a substrate, at least one cavity formed in the substrate, a fluid disposed in the cavity, a plurality of heater elements suspended over the cavity, a plurality of temperature sensing elements disposed substantially in a plane of the substrate and at substantially equal distances from the plurality of heater elements, wherein the plurality of temperature sensing elements is operative to detect a first temperature of the fluid generated in response to an applied acceleration, and to provide a first signal indicative of the applied acceleration;
signal conditioning circuitry operative to receive the signal representing the detected fluid temperature, to implement a temperature dependent function, and to process the received signal using the temperature dependent function for generating an output signal indicative of the applied acceleration, whereby the signal conditioning circuitry provides a compensation for sensitivity variations of the sensor over a predetermined range of temperature, the signal conditioning circuitry including:
a first reference voltage generator including at least one sensor operative to detect an ambient temperature, the first reference voltage generator being operative to provide a first reference voltage level proportional to the ambient temperature;

at least one analog-to-digital (A-to-D) converter operative to receive the signal representing the detected fluid temperature, to convert the received signal to digital form, and to provide a digital signal inversely proportional to the first reference voltage level; and at least one digital-to-analog (D-to-A) converter operative to receive the digital signal provided by the A-to-D converter, to convert the digital signal to analog form, and to provide an analog signal directly proportional to the first reference voltage level, the analog signal corresponding to the output signal indicative of the applied acceleration; and a test circuit including at least one switch and at least one resistive element, the switch being disposed between a respective one of the plurality of heater elements and the resistive element, the switch being operative to switchably connect the respective heater element to the resistive element to generate a desired level of thermal asymmetry within the cavity, thereby simulating an applied acceleration, wherein the plurality of temperature sensing elements is further operative to detect a second temperature of the fluid generated in response to the simulated acceleration, and to provide a second signal indicative of the simulated acceleration.

8. The thermal accelerometer of claim 7 wherein the switch has a duty cycle that is controllable for generating the desired level of thermal asymmetry within the cavity.

* * * * *